(12) United States Patent
Schultze et al.

(10) Patent No.: US 6,762,859 B1
(45) Date of Patent: Jul. 13, 2004

(54) PROCESS FOR GENERATION OF ENGRAVING DATA

(75) Inventors: Stefan Schultze, Langenthal (CH); Urs Denzler, Langenthal (CH); Peter Funk, Ganderkesee (CH)

(73) Assignee: MDC Max Datwyler AG Bleienbach, Bleienbach (CH)

( * ) Notice: Subject to any disclaimer, the term of this patent is extended or adjusted under 35 U.S.C. 154(b) by 0 days.

(21) Appl. No.: 09/549,567

(22) Filed: Apr. 14, 2000

(30) Foreign Application Priority Data

Apr. 14, 1999 (EP) ............................................. 99810311

(51) Int. Cl.[7] ........................ B41C 1/04; H04N 1/409; H04N 1/58
(52) U.S. Cl. ..................... 358/3.29; 358/3.27; 358/532; 358/540
(58) Field of Search .................. 358/3.29, 3.3, 358/3.31, 3.27, 532, 536, 540, 3.2, 3.26; 101/129, 463.1, 484

(56) References Cited

U.S. PATENT DOCUMENTS

| | | | |
|---|---|---|---|
| 4,075,663 A | | 2/1978 | Wellendorf |
| 4,259,697 A | * | 3/1981 | Doelves ..................... 358/3.29 |
| 5,778,091 A | | 7/1998 | Shibazaki et al. |
| 5,828,464 A | * | 10/1998 | Yoshida et al. ............ 358/3.29 |
| 5,907,996 A | * | 6/1999 | Mungenast .................. 101/129 |

FOREIGN PATENT DOCUMENTS

| | | |
|---|---|---|
| EP | B10-056829 | 9/1985 |
| EP | A20-488974 | 6/1992 |
| EP | A20-632396 | 1/1995 |
| WO | 8301696 | 5/1983 |

* cited by examiner

Primary Examiner—Scott Rogers
(74) Attorney, Agent, or Firm—Birch, Stewart, Kolasch & Birch, LLP

(57) ABSTRACT

To generate engraving data (6), especially for an engraving cylinder, based on a vectorized printer's copy (1) and a screen stipulation (2), depending on the geometry of the elements contained in the printer's copy, within predefined variation range for the engraving data (6) at least one working screen (4) is chosen which deviates from the screen stipulation (2). In the printer's copy (1) first at least one line element is chosen. Afterwards within the variation range a working screen is determined which is matched to the periodicity of the determined line element with respect to density and/or angle. Then in the printer's copy (1) font elements are chosen and they are matched to the working screen using font hinting data. If necessary also the screen geometries which belong to the different process colors are stretched or flattened in the line direction and/or in the advance direction in order to be aligned to the chosen line element.

10 Claims, 3 Drawing Sheets

PROCESS FOR GENERATION OF ENGRAVING DATA

TECHNICAL DOMAIN

The invention relates to a process for generation of engraving data, especially for an engraving cylinder, based on a vectorized printer's copy and a screen stipulation. Furthermore the invention relates to a device for engraving of a engraving cylinder according to the engraving data generated using the process.

PRIOR ART

Electro-mechanical engraving of printing forms has been possible at latest since the 1970s with high precision and reliability. Here it is known (compare for example EP 0 056 829 B1) that in four color printing the screens of the different colors must be matched to one another such that no visible color shifts occur (color drift).

In the production of engraving data (i.e the data with which the engraving machines are triggered to machine the engraving cylinder) from a digitally stored printer's copy, conventionally first a high definition bit map is produced to undertake reduction to the screen density stipulated by the client.

It is apparent that in the transition from a high resolution bit map to the stipulated screen density a loss of reproduction accuracy must be tolerated. In practice this often leads to fine line patterns and fonts becoming blurred or irregular in the sense of a Moire effect. In multicolor print products therefore on the line boundaries unwanted color effects can arise because based on the different color screens different line boundaries cannot be avoided.

DESCRIPTION OF THE INVENTION

The object of the invention is to devise a process of the initially mentioned type which ensures the highest possible image quality ("sharpness", "color precision") even in finely structured printer's copies.

The object is achieved by the features of claim 1. As claimed in the invention not simply the stipulated print density (screen fineness) is used (as is actually expected or required by the client). Rather around a stipulated print density a variation range is defined and then within this range depending on the geometry of the elements contained in the actual printer's copy an optimally matched screen is determined.

The invention is not concerned with simply choosing the finest possible screen within the (pre-)defined variation range. Depending on the type of geometry (for example, periodicity of a line pattern) it can be that a slightly coarser screen coincides with the geometry (for example periodicity) and thus allows a image of maximum sharpness. Here it is important that the engraving in principle can produce any screen (for example 70.65 or 63.88) and accepts not only discrete tabular values (for example 65, 70, 90). Furthermore it should be watched that with the process as claimed in the invention the best possible use is made of the initial data which are not definition-limited and thus a high definition bit map is abandoned overall.

The variation range is an acceptably chosen parameter of the process as claimed in the invention. It is typically a maximum 1/3 of the stipulated screen definition and can for example be 20% or less. It need not be symmetrically (for example +/−10%) arranged with respect to the stipulated screen value, but can also be shifted against fine values (for example +12%/−8% screen stipulation).

In the first step, in the printer's copy line elements are determined (this can be done based on vectorized data with relatively simple search commands). Then for them, within the variation range, a so-called working screen which is matched to the geometry (for example width, distance and/or periodicity) of the lines is determined. Depending on the result the working screen can be accepted directly as the engraving screen or further varied and modified. The objective of matching is to bring the half-tone dots (screen cells) and the line (element) boundaries into congruence.

In a following step the font elements of the printer's copy are identified and based on the existing font hinting data are adapted to the working screen. I.e. the font elements (letters with a stipulated font type) are shifted within the boundaries defined by the font hinting data, stretched or flattened in order to bring the horizontal and vertical sections into congruence with the working screen.

In multicolor printing stipulated screen sets are conventionally used. If therefore the screen for one of the colors is adapted to the elements of the printer's copy according to the described process steps, this also yields the working screen of the other colors (compare for example EP 0 056 829). According to the basic idea of the invention however they should also be in agreement with the line and font elements. But generally this is not the case. For this reason the screens of the other colors are also matched in the described manner to the elements of the printer's copy. It is not precluded that for one color an optimally matched screen can be found, but that the pertinent other color screens cannot be sufficiently (i.e. within the allowable limits) stretched, flattened, enlarged or reduced to obtain an acceptable result. Then it is necessary to choose either the aforementioned "optimally matched" color screen only "suboptimally matched" to improve the overall result, so that for the other color screens the desired matching accuracy is possible, or the printer's copy is rejected (for purposes of revision by the graphics specialist).

To further improve printing results the working screen can be matched to the dimensions of the copies (for example the individual label). Also here stretching or flattening of the screen geometry is used.

Finally it can also be provided that between the individual copies in the axial direction of the engraving cylinder (=advance direction of the engraving head) small intervals are inserted. Here "small" means distances which are smaller than the distance between the half-tone dots. They should also lie within the aforementioned variation range of the screens. In this way it is ensured that the copies have not only essentially the same quality, but are completely identical. That is, in each copy possible residual errors are invisible at exactly the same site and in the same way.

Within the framework of the invention it is also possible to vary between the different screens in the advance direction. The purpose of this measure can be for example to achieve an optimum print quality which is matched to each individual copy when entirely different copies (for example, different labels attached to a bottle) are engraved on a cylinder.

The input data can be accommodated in a single data block (file) or also in several separately. In the former case engraving takes place in one pass without interruption. In the latter case the engraving head can (or must) be briefly stopped between the individual data blocks to adjust the control parameters for the modified screens.

In itself the process as claimed in the invention is independent of which engraving technique is used. But it is used mainly for machines which work with laser technology and electromechanically (the latter have an oscillating graving tool for engraving). One such machine is made and can be triggered such that the line intervals in the feed direction and the dot distances (i.e. the distances of the screen cells) are essentially freely adjustable within the lines.

Other advantageous embodiments and combinations of features of the invention follow from the following detailed description and the totality of claims.

BRIEF DESCRIPTION OF THE DRAWINGS

The drawings used to explain the embodiment show the following.

EMBODIMENTS OF THE INVENTION

Figure 1A:
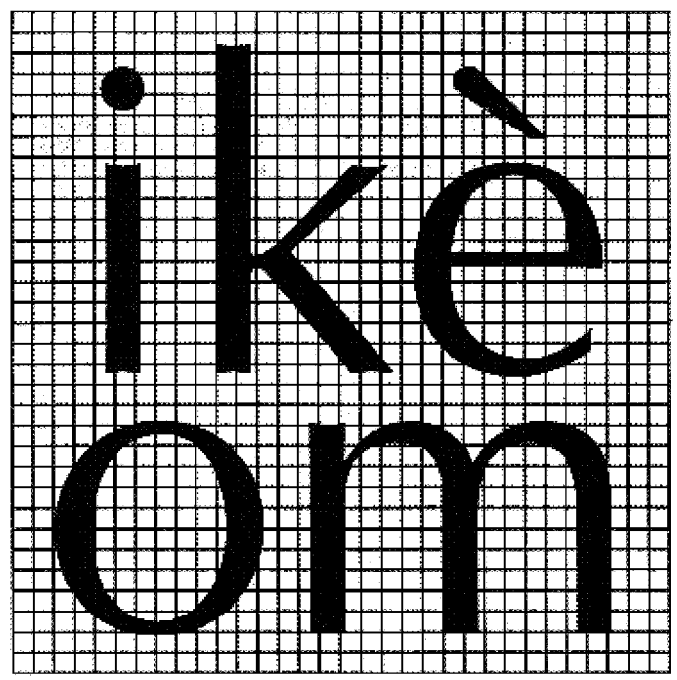
FIGS. 1a, b show a schematic for explanation of the problem of screening of PostScript data.
Figure 1B:
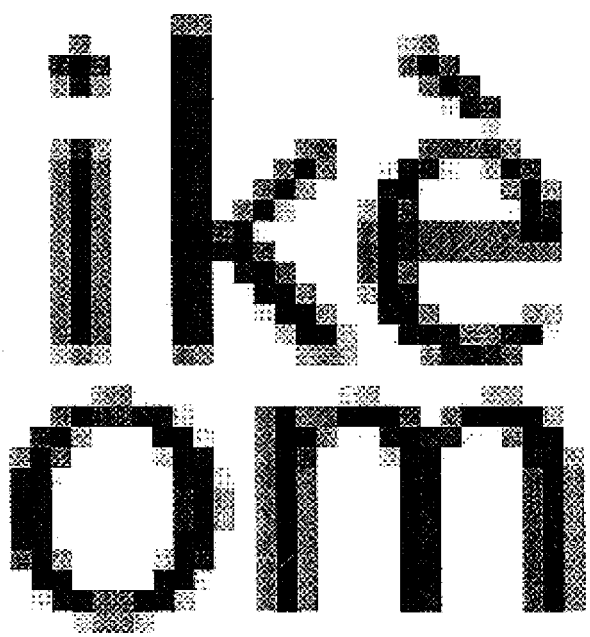

Using FIGS. 1a, 1b the problem of screening will be briefly explained. The point of departure (compare FIG. 1a) in this example is a font in PostScript format. (In the following the term "PostScript" is a synonym for any vectorized or representation of font, line or other image information without limited resolution). When one such font is to be printed in a desired screen (as it illustrated by the grid pattern shown in FIG. 1a) blurriness almost necessarily appears because the screen is not or cannot be matched. to the font elements. In a half tone-capable printing process (for example the engraving process) then a print image as is shown in FIG. 1b will result. It should be noted that for example in four-color printing this problem exists for each of the four colors and in a different way for each. In regularly repeating line elements the problem can be expressed in an especially disruptive manner.

Figure 2:
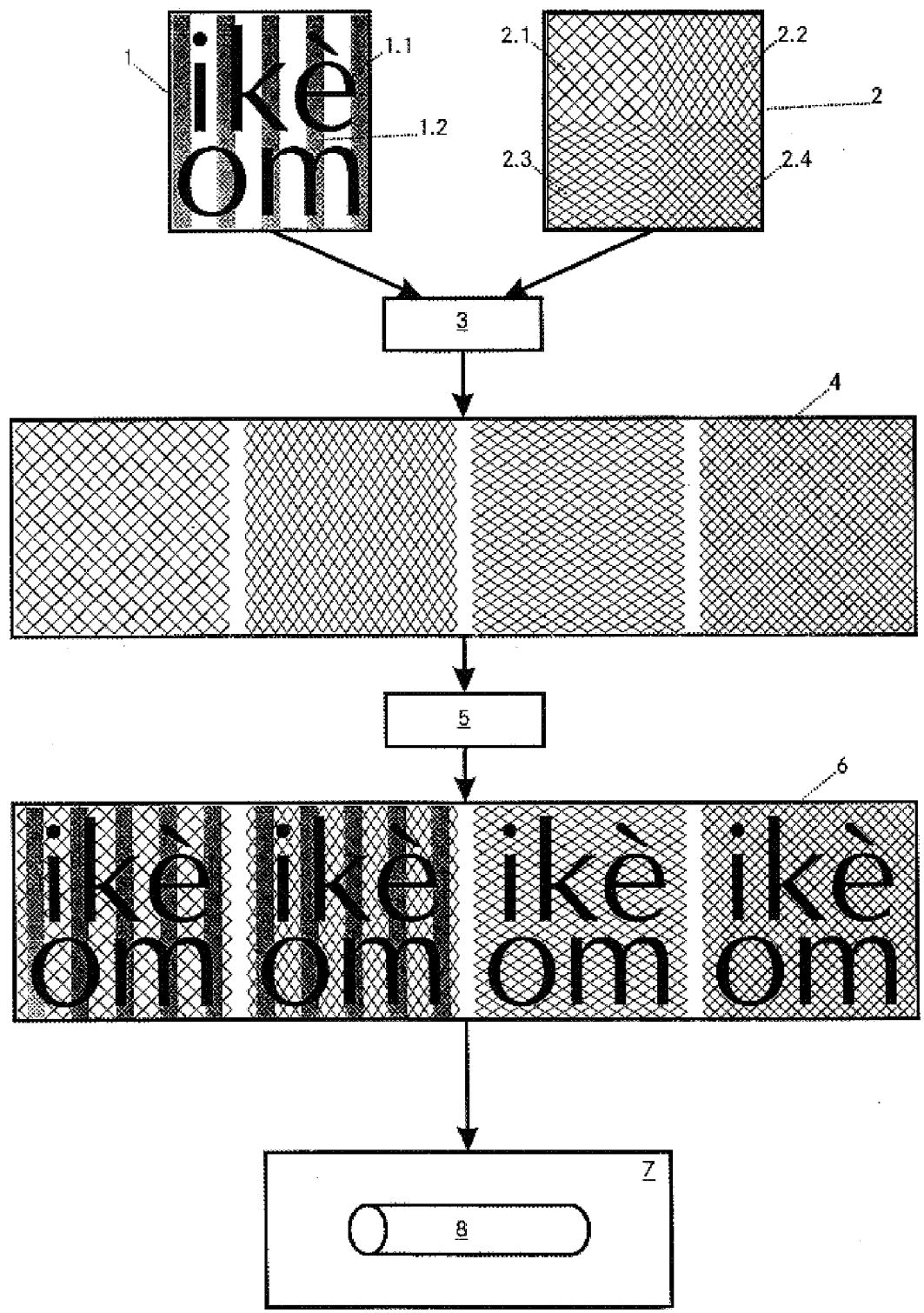
FIG. 2 shows a schematic of the principle of the invention.

To explain the principle as claimed in the invention, reference is made to FIG. 2. A printer's copy 1 in PostScript format is assumed. (It is prepared for example on a computer with a suitable program and is available as a data file). The printer's copy 1 contains diverse font elements 1.1 (here in the foreground) and line elements 1.2 (here in the background). Furthermore one screen set 2 (in this example with four different color screens 2.1, . . . , 2.4 for four process colors) is stipulated by the client, for example by a graphics specialist.

At this point as claimed in the invention a screen computer 3 determines a working screen set 4 which is optimally matched to the printer's copy 1. (In practice the screen computer 3 is software or a software module). The indicated working screen set 4 deviates from the screen set 2 with respect to the print density and/or angling. The deviations however are within a predefined variation range of for example +/−10%. (The size of the variation range in the individual case is such that on the one hand there is no deterioration relative to a print image which is generated with a stipulated screen set 2 and on the other unnecessarily great fineness does not arise. It furthermore can depend on the properties of the print color used, on the carrier material, on the fineness of the screen, etc.). The working screens correspond in the normal case not to a conventional screen (for example, 70 lines per centimeter/40° angling). Rather they can assume any values (for example 73.453 lines per centimeter/38.120° angling). The working screens are essentially determined by automatic analysis of the relevant line elements of the printer's copy 1. If for example there is a strip pattern, the frequencies of the working screen set 4 are matched to the frequencies of the strip pattern such that the intervals and the widths of the lines can be reproduced without local "fluctuations" (floating). Here so-called stroke-hinting information can be used. This yields the information within which boundaries and according to what rules a change of distances and widths is allowable.

Next, the engraving data 6 are computed with an engraving data computer 5. (Here too for the sake of clarity it is mentioned that the engraving data computer 5 together with the aforementioned screen computer 3 can be an integral component of a software package). Within the framework of this processing the font elements if necessary are aligned to the working screen set 4 using possible font-hinting information (which is assigned to the font type).

The engraving data 6 are finally transferred to a mechanical engraving machine 7 for producing the engraving cylinder 8. It goes without saying that the engraving machine 7 must be made such that in principle it can engrave any screen. In other words: it must be possible to set the angular velocity of the engraving cylinder 8 (or the working frequency of the graving tool) and the increment of advance of the engraving head to any values.

Figure 3:
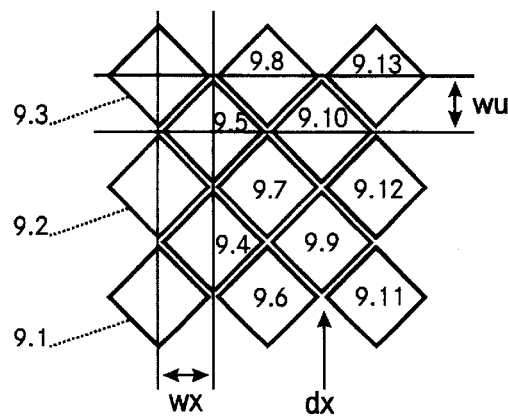
FIG. 3 shows a schematic of one arrangement of screen cells in an overhead view.
Figure 4:
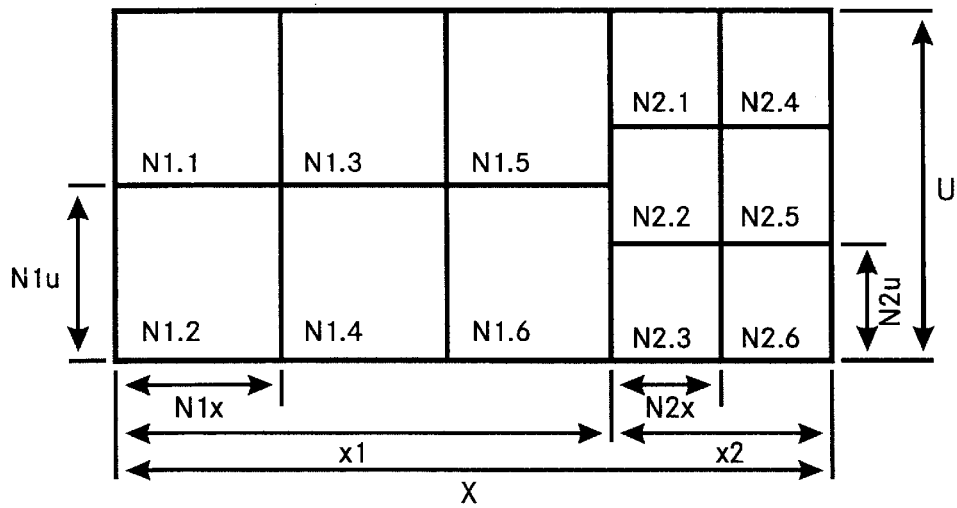
FIG. 4 shows one example of the division of the surface of a cylinder into different copies and sections.

FIG. 3 shows for example a typical arrangement of screen cells 9.1 to 9.13 as are engraved for example into the surface of an engraving cylinder with a mechanical engraving machine. For the following example the following parameters are of interest (x=axial direction, u=peripheral direction):

wx=interval of the centers of the screen cells of two engraving columns;

wu=interval of the centers of the screen cells of two engraving lines;

dx=distance between two screen cells which lie next to one another in one engraving line FIG. 4 illustrates for example one possible breakdown of the surface of an engraving cylinder into difference blocks, also called copies (for example, labels of different size):

N1=block (copy) to be engraved in block size 1

N2=block (copy) to be engraved) in block size 2

It is assumed that the individual copies N1.1 and N2.i (i=1 to 6) are identical:

N1.1=N1.2=N1.3=N1.4=N1.5=N1.6

N2.1=N2.2=N2.3=N2.4=N2.5=N2.6

Furthermore the following nomenclature is used:

N1x, N2x—width of copies:

N1x_mm, N2x_mm=width of copies in mm

Nix_cell, N2x_cell=width of copies in number of intervals wx;

N1u, N2u=height of copies:

N1u_mm, N2u_mm—height of copies in mm;

N1u_cell, N2u_cell=height of copies in number of intervals wu;

X=width of the cylinder:

X_mm=width of the cylinder in mm;

X_cell=width of the cylinder in number of intervals wx;

U=periphery of the cylinder:
U_mm=periphery in mm;
U_cell=periphery in number of intervals wu;
x1=cylinder section 1
x2=cylinder section 2
Fx(Ni)=screen period in copies Ni in the axal direction in mm
Fu(Ni)=screen period in copies Ni in the peripheral direction in mm
fx1, fu1—color portion of the image screen
fx2, fu2—white portion of the image screen The following sample explanation is based on the following problem formulation: Copies N1 and N2 should each be engraved six times with maximum block quality. In doing so the copy N2 should be a version of the copy N1 which is smaller in a ratio of 2/3. As has been explained using FIG. 2, a screen set is also stipulated to which the working screen set in the final effect is to be similar. The intervals wx and wu between the centers of the two engraving columns or engraving lines are thus stipulated.

Figure 5:
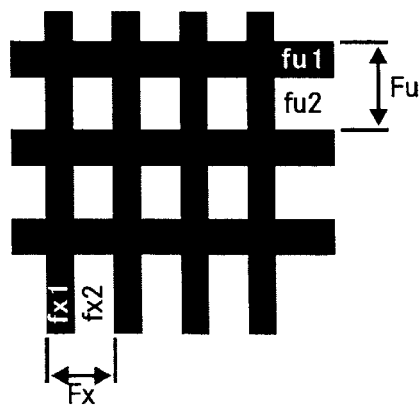
FIG. 5 shows one example of a grid pattern to be processed.

In the printer's copy there is for example a grid structure (line element) as shown in FIG. 5. Due to the varied size of the copies N1 and N2 the specific geometry of the grid structure yields a total of four structure frequencies Fx(N1), Fu(n1); Fx(n2), Fu(N2) which must be brought into congruence with the working screen.

In principle the greatest common denominator gcd between the structure periods Fx(N1) and Fx(N2) and Fu(N1) and Fu(N2) must be determined. Because in this example (because of the two copies of different size which cannot be easily matched to one another due to the size ratios) modification of the intervals wu and wx for adjustment of the optimum working screen period would already be greatly limited, the cylinder surface according to one preferred embodiment is divided first into two sections x1 and x2 (data blocks) which, since they lie in the axial direction, can be engraved with different working screens. The two (inherently each homogenous) sections x1 and x2 can be treated completely independently of one another (and analogously to one another). In the following therefore reference is made only to section x1.

In the next step the greatest common denominator gcd must be compared to the screen structure (wx, wu) of a copy (for example N1.1). If the greatest common denominator gcd should agree by way of exception with the screen structure or be an integral multiple thereof, the process can be terminated without changing wx and wu. Generally this is not the case and the intervals wx and wu must be modified such that the greatest common denominator gcd in the u-direction and the interval wu on the one hand and the greatest common denominator in the x direction and wx on the other hand (in the sense of a modulus operation, therefore except for an integral multiple) are congruent. (If for example Fu=0.5 mm and wu=0.11 mm, the interval wu must be changed such that exactly four or exactly five half-tone dots fall on the period Fu). It must be considered as the boundary condition that this modification varies within certain limits (variation range) in order to later attain the required similarity to the screen stipulation. If the aforementioned quantities can be brought into agreement, the process is thus completed, i.e. wu and wx are matched to the required degree. (In practice the matching is minor).

If agreement cannot be achieved, a frequency superposition can be chosen with high periodicity in order to minimize Moire and floating. As a result of this procedure new values are output for wu and wx.

The dimensions of the copy N1x_mm and N1u_mm are now divided by the newly determined intervals wu and wx. This yields the quantities N1x_cell, N1u_cell (on which basis the screen image can be generated). If in doing so fractions of screen cell intervals arise, the size in mm cannot be divided by the intervals wu and wx without remainders, this is balanced later by the modification of the height or width of the screen cells.

The engraving data computer now aligns first of all the other pixels of the copy to the computed working screen. Here the generally known (developed by Adobe) processes of "font hinting" and stroke hinting" are used.

If it is only monochrome production or the aforementioned grid structure cannot be printed in one process color, but in only one special color, the entire printer's copy can now be screened. Otherwise the aforementioned matchings for all affected color screens can be computed and if necessary also equalized to one another (i.e. all color screens must agree). Because the process steps for all color screens are in principle the same, this is not detailed here.

Since in the example as shown in FIG. 4 several copies are engraved both in the axial and peripheral direction, the aforementioned matching of the intervals wx and wu can lead to unwanted "error propagation" (accumulation). This can be compensated by re-modification of the intervals wx and wu. In this case however screening is not done again, but the screen cells (cups) are simply changed in shape (stretched/flattened).

In order to prevent problems due to mismatch of screen combinations between the various colors, the interval dx can likewise be changed. Small correction distances (on the order of less than 1–2%) are inserted.

This step does change the metric dimension within the blocks, but only to a smaller degree than the change of sizes which occurs later in the print, for example by shrinkage of the paper.

The engraving machine now acquires the following information: the screen data file for the cylinder section x1 with the pertinent intervals wu and wx and the determined corrections: the screen data file for the cylinder section x2 with the pertinent intervals wu and wx and the determined corrections.

The invention can be varied in diverse ways. Basically it is possible to introduce corrections at each step, therefore not only in matching the line and font elements, but also in the consideration of the dimensions of the copies and the number or arrangement of the copies on the cylinder surface. For example it can be advantageous for copies which are later punched out to make small adaptations within the punching line (for example by entering an additional feed step). Nor is it always necessary to run through all the described stages.

In summary it can be stated that the invention creates new possibilities, especially in the mechanical production of engraving cylinders in order to produce high quality print products. The process can proceed fully automatically or with manual intervention possibilities.

What is claimed is:

1. Process for generation of engraving data (6), especially for an engraving cylinder, based on a vectorized printer's copy (1) and a screen stipulation (2), characterized in that depending on the geometry of the elements contained in the printer's copy, within predefined variation range for the engraving data (6) at least one working screen (4) is chosen which deviates from the screen stipulation (2).

2. Process as claimed in claim 1, wherein in the printer's copy (1) first at least one line element is chosen and wherein within the variation range a working screen is determined which is matched to the periodicity of the determined line element with respect to density and/or angle.

3. Process as claimed in claim 2, wherein the working screen is adapted with additional consideration of stroke hinting data.

4. Process as claimed in claim 2, wherein in the printer's copy (1) font elements are chosen and wherein they are matched to the working screen using font hinting data.

5. Process as claimed in claim 1, wherein the screen geometries which belong to the different process colors are stretched or flattened in the line direction and/or in the advance direction in order to be aligned to the chosen line element.

6. Process as claimed in claim 1, wherein from the printer's copy (1) at least two copies are chosen and wherein the working screen is adapted to the copies by additional stretching or flattening.

7. Process as claimed in claim 6, wherein the engraving data (6) are adapted to the dimensions of the engraving cylinder by inserting additional advance increments between the individual copies.

8. Process as claimed in claim 1, wherein the engraving data for the engraving cylinder are divided in the advance direction into sections with different working screens.

9. Process as claimed in claim 1, wherein the variation range is $\leq 1/3$, especially $\leq 1/5$ of the print density and/or angling.

10. Device for engraving of an engraving cylinder according to the engraving data generated using the process as claimed in claim 1, characterized by freely adjustable advance in the axial direction and a freely adjustable screen cell interval in the line direction.

* * * * *